Figure 1:
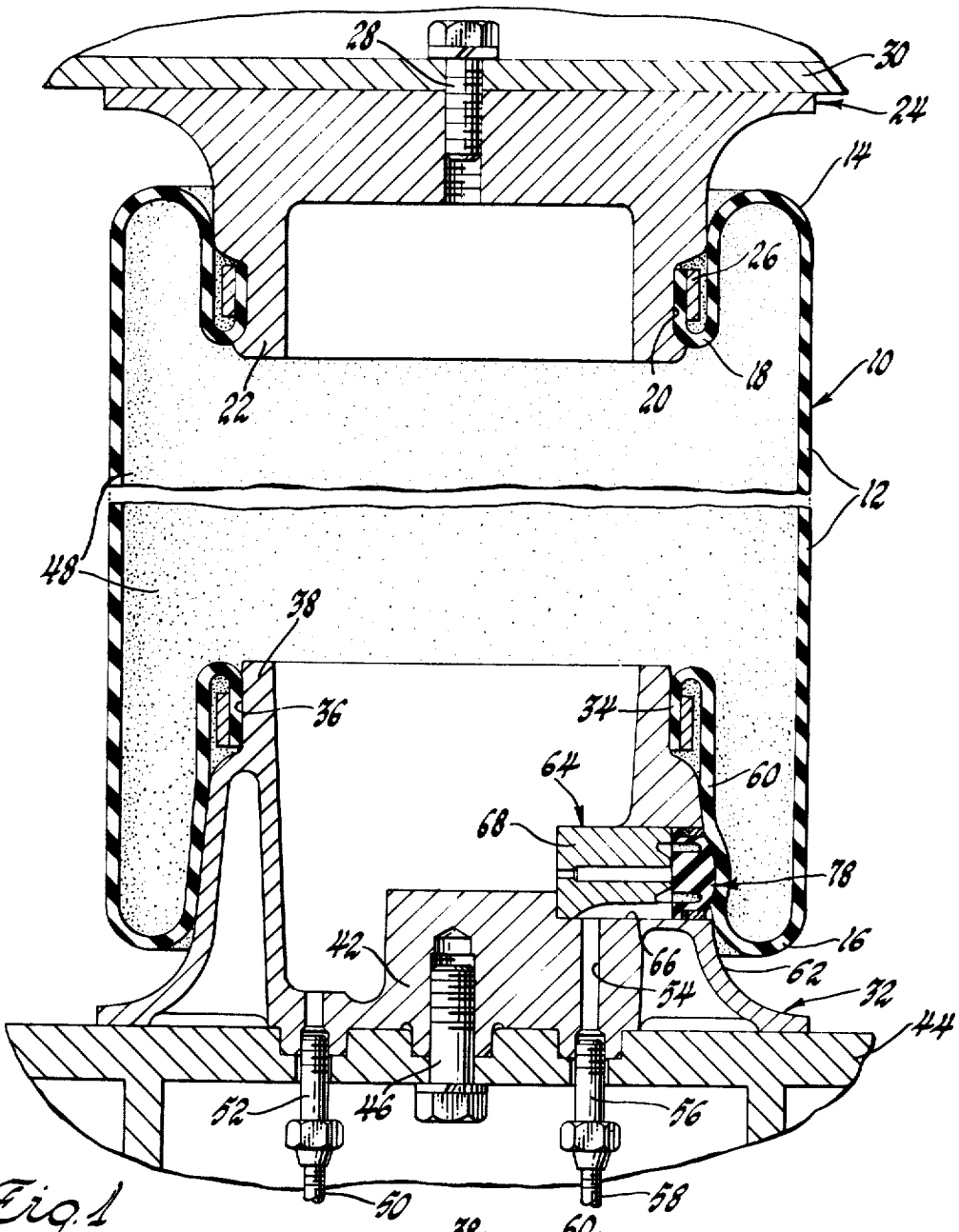

United States Patent [19]
Clary

[11] 3,876,193
[45] Apr. 8, 1975

[54] BOOT CONTROLLED UNITARY VALVE AND SEAL ASSEMBLY

[75] Inventor: Edward L. Clary, Flint, Mich.

[73] Assignee: General Motors Corporation, Detroit, Mich.

[22] Filed: Nov. 28, 1973

[21] Appl. No.: 419,516

Related U.S. Application Data

[63] Continuation of Ser. No. 310,645, Nov. 29, 1972, abandoned.

[52] U.S. Cl. .................................... 267/65 B
[51] Int. Cl. .................................... B60g 11/26
[58] Field of Search .......................... 267/65 B

[56] References Cited
UNITED STATES PATENTS
2,916,298  12/1959  McMullin .................... 267/65 B
2,984,476  5/1961  Turner ....................... 267/65 B Primary Examiner—James B. Marbert
Attorney, Agent, or Firm—Charles R. White

[57] ABSTRACT

A control valve assembly for a vehicle leveling system of the type including an air spring having a diaphragm with rolling ends thereon closed by pistons movable toward and away from one another in accordance with the vehicle load wherein one of the pistons includes a side bore thereon in which is located a valve insert having an axial opening therethrough and a valve seat, for controlling flow between pressurizable chamber of the air spring and an exhaust passageway in the piston. A single unitary elastomeric member seals the bore and cooperates with the spring diaphragm to open and close against the valve seat to control exhaust flow from the air spring.

5 Claims, 2 Drawing Figures

PATENTED APR 8 1975

3,876,193

BOOT CONTROLLED UNITARY VALVE AND SEAL ASSEMBLY

This is a continuation of application Ser. No. 310,645, filed Nov. 29, 1972 now abandoned.

This invention relates to vehicle leveling system control valves and more particularly to vehicle leveling system control valves of the type having leveler unit operated valving components moved into open and closed positions in response to changes in load on the leveler units.

Vehicle leveler units of the type including a sleeve having rolling lobes thereon connected to and supported on end piston members can be controlled by the provision of a valving component on one of the pistons which is operated in response to movement of a rolling lobe onto and off of the piston.

Arrangements have been proposed wherein a valving assembly is located internally of one of the pistons and sealed internally of the piston by a separate boot member. In such cases the boot member is engaged by an inner wall of the rolling lobe to be deflected interiorly of the piston so as to engage a stem of the valve mechanism to maintain it in a closed position. When the air spring is unloaded the inner wall of the lobe will move from the piston to allow the boot thereon to move exteriorly of the piston and away from the stem operator of the valving mechanism. This permits exhaust flow from the pressurizable chamber of the air spring through exhaust passageway means formed in one of the pistons.

Such arrangements require separate valve components and a separate boot which will seal the valve assembly within the piston. Furthermore, the seal boot must be readily yieldable in response to movement of the inner wall of the rolling lobe onto and off of the outer surface of the piston to locate the valve mechanism in its opened and closed positions.

An object of the present invention is to simplify height control valve assemblies which use an inner wall member of a rolling lobe to position valve mechanism components in opened and closed positions by the provision of a single unitary elastomeric member including a spherical head portion thereon and an internally located integral stem normally positioned by a web portion of the unitary member against a valve seat to maintain minimum pressure retention within the air spring and wherein the stem will be further biased closed when an inner wall of a rolling lobe engages the spherical head and will be opened to exhaust pressurized fluid from the air spring when the inner wall of the lobe moves out of engagement with the stem.

Yet another object of the present invention is to simplify and reduce the cost of an integral load responsive valve controller on a leveler unit of the type having relatively movable members by the provision of a single unitary member having a portion thereon supported within one of said members and a head portion thereon extending therefrom so as to be engageable with a relatively movable other member of the leveler unit and wherein the unitary member includes an enlarged control portion located internally of and axially inwardly of the spherical head to be shifted by the spherical head into opened and closed positions with respect to a valve seat interposed between the pressurizable air chamber of the leveler unit and exhaust passageway means therein.

Still another object of the present invention is to improve the control of pressure within an air spring of the type having a sleeve with rolling lobes on either end thereof connected to and supported by the outer surface of end piston members by the provision of a single unitary seal and valve member supported in a lateral bore in one of the pistons so as to locate an outer spherical surface thereon in a position to be engaged by the inner wall of a rolling lobe and where the single unitary member includes a peripheral web thereon connecting the spherical head to a sealing flange located within the bore; the web being normally prestressed to hold an internally located stem extension of the spherical head in a first closed position wherein a minimum pressure is maintained in the air spring and which will yield upon the occurrence of a greater pressure within the air spring in response to a predetermined pressure buildup on the stem to open the valve seat to permit exhaust flow from the air spring and wherein the spherical head will receive the inner wall of a rolling lobe to press inwardly to deform the web and shift the stem into a move biased position against the seat when the load on the air spring is increased above a predetermined point.

Further objects and advantages of the present invention will be apparent from the following description, reference being had to the accompanying drawings wherein a preferred embodiment of the present invention is clearly shown.

Figure 2:
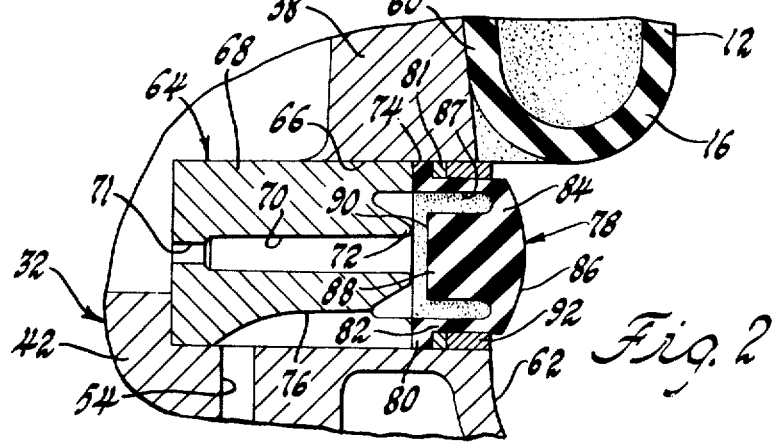

In the Drawings:

FIG. 1 is a view in vertical section of an air spring type leveler unit including the present invention; and FIG. 2 is an enlarged fragmentary sectional view of a combination unitary seal and valve member shown in its exhaust position.

Referring now to the drawing in FIG. 1, air spring type leveler unit 10 for use in a vehicle leveling system is illustrated. It includes a centrally located sleeve 12 having rolling lobes 14, 16 on opposite ends thereof. The rolling lobe 14 includes an inner wall 18 having the end thereon supportingly received within a groove 20 of the inner end 22 of an upper piston unit 24. A clamp ring 26 holds the end 18 in sealing engagement therewith. The piston 24 is secured by means of a threaded stud 28 to a chassis frame cross member 30 for transferring a portion of the sprung weight of a vehicle to the air spring unit 10.

The opposite end of the air spring unit 10 is closed by a lower piston 32 which supportingly receives an end portion 34 of the rolling lobe 16 in a groove 36 formed in the inner end 38 of piston 32.

The base 42 of the air spring 32 is connected to a frame portion 44 of the unsprung mass of a vehicle suspension by means of a threaded stud 46.

The sleeve 12 and pistons 24, 32 together define a pressurizable air chamber 48. The air chamber is connected to a pressure conduit 50 through a fitting 52 threadedly received in the base 42 for supplying pressurized air from a pressure source to inflate air spring 10.

The air spring 10 further includes an exhaust passageway 54 formed in the base 42 at one side thereof. Passageway 50 is connected to an exhaust fitting 56 which is, in turn, connected to an exhaust conduit 58 for receiving pressurized air from the chamber 48 during an exhaust phase of operation.

A vehicle leveling system of the type including an air spring 10 as set forth above is more particularly set forth in copending U.S. application Ser. No. 307,378, filed Nov. 17, 1972, by Robert E. Owen for Leveling System with Center Mounted Air Spring, wherein the details of a representative leveling system are more particularly set forth. For purposes of understanding the present invention it is only necessary to understand that pressurized air from a suitable source is directed to the conduit 50 into the pressurizable chamber 48 for inflating it to produce a resultant force between the pistons 24, 32 so as to cause the air spring 10 to produce a supplemental load supporting uplifting force between the unsprung spring portion 44 and the chassis frame 30 to carry additional load placed on the vehicle to maintain a predetermined height relationship therebetween. When additional load is placed on the vehicle, the pistons 24, 32 are moved together. Under this condition of operation an inner wall 60 of the rolling lobe 16 is supported on a bell shaped outer surface 62 of the piston 32 as illustrated in FIG. 1.

The inner wall 60 cooperates with a valve assembly 64 in accordance with the present invention to block communication between the pressurizable air chamber 48 and the exhaust passageway 54.

When load is removed from the vehicle primary suspension springs, as more particularly set forth in the above mentioned copending application, they will move the cross frame 30 away from the unsprung frame portion 44 so as to move the pistons 24, 32 apart from one another. This will cause the inner wall 60 to roll off of the bell shaped outer surface 62 to assume a position as shown in FIG. 2. At this point, the valve assembly 64 is conditioned for an exhaust phase or minimum pressure retention phase of operation to be discussed.

Referring now more particularly to the valve assembly 64 it in part is defined by a lateral bore 66 formed through a side wall surface 62 of piston 32 with an inner end at the chamber 48 and an outer end intersecting surface 62. The bore 66 supportingly receives a valve insert member 68 having a longitudinal central passageway 70 formed therethrough. At one end, the passageway 70 communicates through an orifice 71 with pressurizable chamber 48. At the other end thereof it is surrounded by a centrally located annular valve seat 72. In turn the valve seat 72 is surrounded by an annular end seal surface 74. The insert 68 is under cut at 76 to form fluid communication between exhaust passageway 54 and the bore 66 outboard of the end seal surface 74.

In accordance with certain principles of the present invention the bore 66 supportingly receives a single unitary combination seal and valve member 78. It includes a flanged base 80 supportingly received in the bore 66 and located in sealing engagement with the end seal surface 74 against which it is sealingly retained by means of a snap ring 81 which is seated against the flange 80 and radially held within the bore 66. The flange base 80 is integrally connected by means of a resilient web 82 to a heat portion 84 having a spherical outer surface 86 thereon located slightly outwardly of the bell shaped lobe support surface 62 so as to be located in interfering relationship with the inner wall 60 thereof.

Additionally the unitary member 78 includes an inwardly located bore 87 surrounding an axially directed stem 88 connected centrally of the head 84 and extending therefrom into coaxial alignment with the valve seat 72 so as to locate a flat end surface 90 thereon in overlying relationship with the valve seat 72. The web 82 is located in spaced surrounding relationship to stem 88 by bore 87.

When vehicle load is added and the inner wall 60 of the rolling lobe 16 is positioned as shown in FIG. 1 it will press against the spherical surface 86 of the head 84. The lobe 16 is pressurized interiorly thereof and it will shift the stem 88 axially to locate the flat surface 90 thereon in tight sealed engagement with the seat 72. When so positioned, the valve is designed to maintain a predetermined maximum pressure in the pressurizable chamber 48 so as to produce a supplemental load carrying capacity in the air spring unit 10.

The flange 80 will seal the bore 66 against dirt, water and other debris exteriorly of the air spring unit 10 while the inward pressing action of the inner wall 60 on the spherical surface 86 will urge the stem 88 into a closed position to maintain elevated pressure within the chamber 48.

When the vehicle is unloaded so as to move the inner wall 60 into a position shown in FIG. 2, the lobe 16 is no longer pressed against head 86. Pressure within the chamber 48 will act on the flat surface 90 to cause flexure in the web 82 until the flat surface 90 is moved away from the seat 72. Pressurized air will then exhaust through the passageway 70 and the under cut 76 into the exhaust passageway 54 until pressure within the chamber 48 is reduced to a point at which the inner wall 60 will be returned into overlying relationship with the spherical surface 86.

One feature of the present invention is that the flat surface 90 on the stem 88 will engage the seat 72 and be maintained thereagainst to produce a controlled amount of prestress in the web 82. Thus the web 82 will press the stem 88 against the seat 72 to maintain the minimum pressure condition when the vehicle is unloaded. This minimum pressure condition helps maintain the shape of the rolling lobes 14, 16 so as to assure that they will smoothly roll onto and off of the outer surface of the end pistons of the air spring unit 10.

The outer surface of the web 82 is located radially inwardly of the bore 66. The illustrated embodiment includes a filler sleeve 92 which is inserted within the bore 66 to supportingly receive the outer surface of the web 82 as best seen in FIG. 2. This controls lateral flexure of the valving and seal member 70 with respect to the bore 66. The filler sleeve 92 will maintain the sealing flange 80 in good sealing engagement with the surface 74 thereby to prevent leakage from the system around the flange 80.

In one working embodiment of the present invention the seal and valve member 78 maintain pressures from a minimum of 10 p.s.i.g. to a maximum 60 p.s.i.g.

In the working embodiment the single unitary valve and seal member 78 is made from a black epichlorohydrin elastomer with an 1,800 p.s.i. tensile strength; 200 percent elongation; 52 Shore A Durometer, and a 40 percent compression set after 22 hours. It has the following dimensions: surface 86, 0.438 inch radius; diameter is 0.278 inches; web 82, thickness 0.04 inches; bore 87 diameter 0.420 inches; stem 88, length 0.300 inches.

While the embodiment of the present invention as herein disclosed constitutes a preferred form, it is to be understood that other forms might be adopted.

What is claimed is:

1. A vehicle leveling system control valve assembly comprising: an air spring having a tubular sleeve with a rolling lobe at one end thereof, a piston member with an outer annular surface supportingly receiving said rolling lobe, means including said sleeve and piston member for forming a pressurizable chamber, said piston member and said sleeve moving relative to one another in accordance with vehicle load on said air spring, said piston having a lateral bore therein with an inner end in communication with said pressurizable chamber and an outer end intersecting the outer surface of said piston, said piston having a fluid exhaust passage therein said rolling lobe on said piston including an inner wall that covers said outer bore end when said air spring is loaded and which uncovers said outer bore when said air spring is unloaded, a valve insert supported within said bore said valve insert having an air passage therein for pneumatically connecting said chamber and said exhaust passage, said insert having a valve seat at one end thereof and having an annular outer end surface thereon located in surrounding relationship radially outwardly of said valve seat, a unitary valve and seal member of elastomer material having a flanged end thereon seated within said bore in sealed engagement with the outer end surface of said insert, said valve and seal member including a spherically shaped head located outwardly of said outer annular surface so as to be engageable by said inner wall of said rolling lobe, said valve member including an integral axially inwardly directed stem aligned with said spherical head and located co-axially of said seat, said stem including a flat end surface thereon engageable with said seat for controlling flow through said air passage into said fluid exhaust passage, an annular yieldable web on said valve member located in spaced surrounding relationship to said stem and integrally joining said spherical head with said flange, said valve member having a first operative position when said inner wall is off said annular surface, said stem having a length when said valve is in its first operative position to engage said seat and prestress said web to maintain a minimum retention of pressure witin said chamber when said valve is in its first operative position, said valve having a second operative position wherein said inner wall of said rolling lobe engages said spherical head and pressure within said lobe forces said stem axially toward said valve seat to increase the pressure on said stem to maintain it against said seat to hold a greater pressure within said chamber, said valve having a third operative position when said inner wall is off said annular surface and the pressure within said chamber exceeds the minimum pressure to produce a resultant force on the flat end surface of said stem to shift said stem against said spherical head and move it outwardly against the restraint of said web thereby to move said stem out of sealing engagement with said seat whereby pressurized fluid is exhausted across said seat to said fluid exhaust passage.

2. A pressure controller for a vehicle leveling system comprising: an air spring having a tubular sleeve with rolling lobes on each end thereof, a piston member sealingly connected to each of said rolling lobes, each of said piston members including an outer surface thereon supporting an inner wall portion of each of said rolling lobes as said rolling lobe moves onto and off of each of said pistons, means including said sleeve and said pistons for forming a pressurizable air chamber inflatable to produce a supplemental load supporting force between said pistons, said pistons moving toward each other when the vehicle is loaded and moving apart from one another when the vehicle is unloaded to cause said rolling lobes to move onto and off of the outer surface thereon, means forming an exhaust passageway in one of said pistons, means forming a bore in said one of said pistons intersecting said exhaust passageway means and communicating with said pressurizable chamber, a valve insert located within said bore including an annular seat therein and a flat end seal surface thereon located radially outwardly of and in surrounding relationship to said annular seat, said annular surface and said seat being located in a common plane, a unitary elastomeric seal and valve member including a flange thereon located within said bore and in sealed relationship with said annular insert seal surface for sealing said bore, said unitary member including a spherical head thereon located outwardly of said outer piston surface to be engageable with the inner wall of the lobe supported thereon, a web connecting said spherical head with said flange movable in an axial direction, an integral valve stem located centrally inwardly of said spherical head and extending axially therefrom to a point adjacent said seat, said stem having an outer peripheral surface thereon located radially inwardly of said web and including a flat surface on one end thereof maintained in a first operative position by said web against said seat to hold a minimum pressure within said chamber, said spherical head being engaged by the inner wall of the rolling lobe when the air spring is loaded to impose lobe pressure on said head to cause said web to buckle thereby to cause said stem to press more firmly at the flat surface thereon against said seat so as to hold a greater pressure within said pressurizable chamber, said valve web exerting a spring force against the force of said inner wall for returning said spherical head outwardly of said surface when said inner wall is moved from the outer surface of said piston upon unloading of said air spring and chamber pressure acting on said stem to move it axially from said seat to permit the exhaust of pressurized air from said pressurizable chamber to said exhaust passageway.

3. A leveling unit for a vehicle having sprung and unsprung components comprising in combination an upper member adapted to be connected to said sprung component of said vehicle, a lower member spacially aligned with said upper member adapted to be connected to said unsprung component of said vehicle, one of said members having a collar portion which extends toward the other of said members, a tubular sleeve of elastomeric material having upper and lower end portions respectively connected to said upper and lower members to form an expansible and contractible cylinder, said sleeve having rolling lobe means adapted to surround said collar portion and move axially thereon, supply means operatively connected to the interior of said cylinder for supplying a pressure fluid thereto to linearly expand said cylinder to linearly move said upper member away from said lower member and to cause the rolling movement of said lobe means linearly on said collar portion, an exhaust port in said one of said members, fluid control means for exhausting fluid from said cylinder in response to the movement of said upper member a predetermined distance away from said lower member, said fluid control means comprising fluid exhaust passage means in one of said members, said fluid control means further comprising valve means operatively mounted in said exhaust passage means movable between first and second positions to respectively open and close said exhaust passage means with respect to said exhaust port means, said valve means having contact means extensible beyond said collar portion for engagement by said rolling lobe means so that said rolling lobe means can move said valve means to said first position to close said exhaust passage means, and said valve means being movable to said second position by pressure in said exhaust passage means to open said passage means to said exhaust port means in response to movement of said rolling lobe on said collar portion out of contact with said contact means.

4. A vehicle leveling unit operatively connected between sprung and unsprung portions of a vehicle comprising axially aligned first and second members connected respectively to the sprung and unsprung portions of the vehicle, said first member having a base and a wall extending axially from said base toward said second member, an elastomeric sleeve operatively connected to said first and second members providing an expansible and contractible fluid chamber therebetween, fastener means securing one end portion of said sleeve to said wall adjacent to the end thereof, said sleeve having an inner wall portion extending into direct engagement with said wall of said first member and an outer wall portion spaced outwardly from said inner wall portion, said sleeve further having an intermediate portion connecting said first and scond wall portions and cooperating therewith to form a rolling lobe means for moving axially on said wall of said first member in a first direction when said chamber expands and in an opposite direction when said chamber contracts, pressure fluid supply means operatively connected to said chamber for supplying said chamber with pressure fluid for expanding said chamber to move said first and second members axially away from each other, an exhaust port in said first member, exhaust control means operatively connected to said chamber for exhausting fluid therefrom to said exhaust port to cause said chamber to contract and said first and second members to move axially toward each other, said exhaust means comprising an insert having an exhaust passage extending from the interior to the exterior of said chamber, said exhaust passage having an inlet and an outlet, a one piece elastomeric exhaust valve element operatively disposed in sealing engagement in said wall of said first member adjacent to said outlet of said exhaust passage, said valve element having a head and a stem portion movable inwardly by said lobe means so that said stem portion closes said exhaust passage, said stem portion and said valve element being movable outwardly to open said exhaust passage in response to predetermined linear expansion of said chamber and movement of said lobe means out of contact with said head portion.

5. In a vehicle leveling unit connected between sprung and unsprung portions of a vehicle comprising first and second axially spaced connector members secured respectively to said sprung and unsprung portions of the vehicle, said first member having a generally cylindrical wall extending axially toward said second member, a tubular elastomeric sleeve operatively connected to said first and second members to form an axially extensible and contractible fluid chamber therebetween, said sleeve having an annular lobed portion positioned annularly around a portion of said wall, fluid supply means for supplying pressure fluid to said fluid chamber to effect the axial extension thereof and to thereby respectively move said first and second members axially away from each other, and to cause said lobed portion to roll on said cylindrical wall toward said second member, said cylindrical wall having a bore extending radially therethrough, a seal and valve member operatively mounted in the outer end of said bore to seal one end of said bore to prevent entry of foreign matter therein, exhaust passage means communicating with said bore, insert means operatively disposed in said bore, said insert means having a first passage therethrough communicating with said chamber and a second passage therein for connecting said first passage to said exhaust passage, said insert means having a valve seat at the outer end of said first passage, said seal and valve member comprising a valve element with a stem portion for engaging said valve seat, said seal and valve member having a contact portion which extends beyond the limit of said cylindrical wall for contact by said lobe portion so that said lobed portion can move and said stem portion into engagement said valve seat to seal said first passage to thereby prevent the exhaust of fluid into said chamber, and permit the axial extension of said chamber, and said stem portion being movable off of said valve seat in response to predetermined pressure in said chamber and movement of said lobed portion out of contact with said contact portion to permit exhaust of fluid from said chamber so that said chamber axially contracts until said lobed portion moves said seal and valve means radially inwardly into sealing engagement with said valve seat.

* * * * *